UNITED STATES PATENT OFFICE.

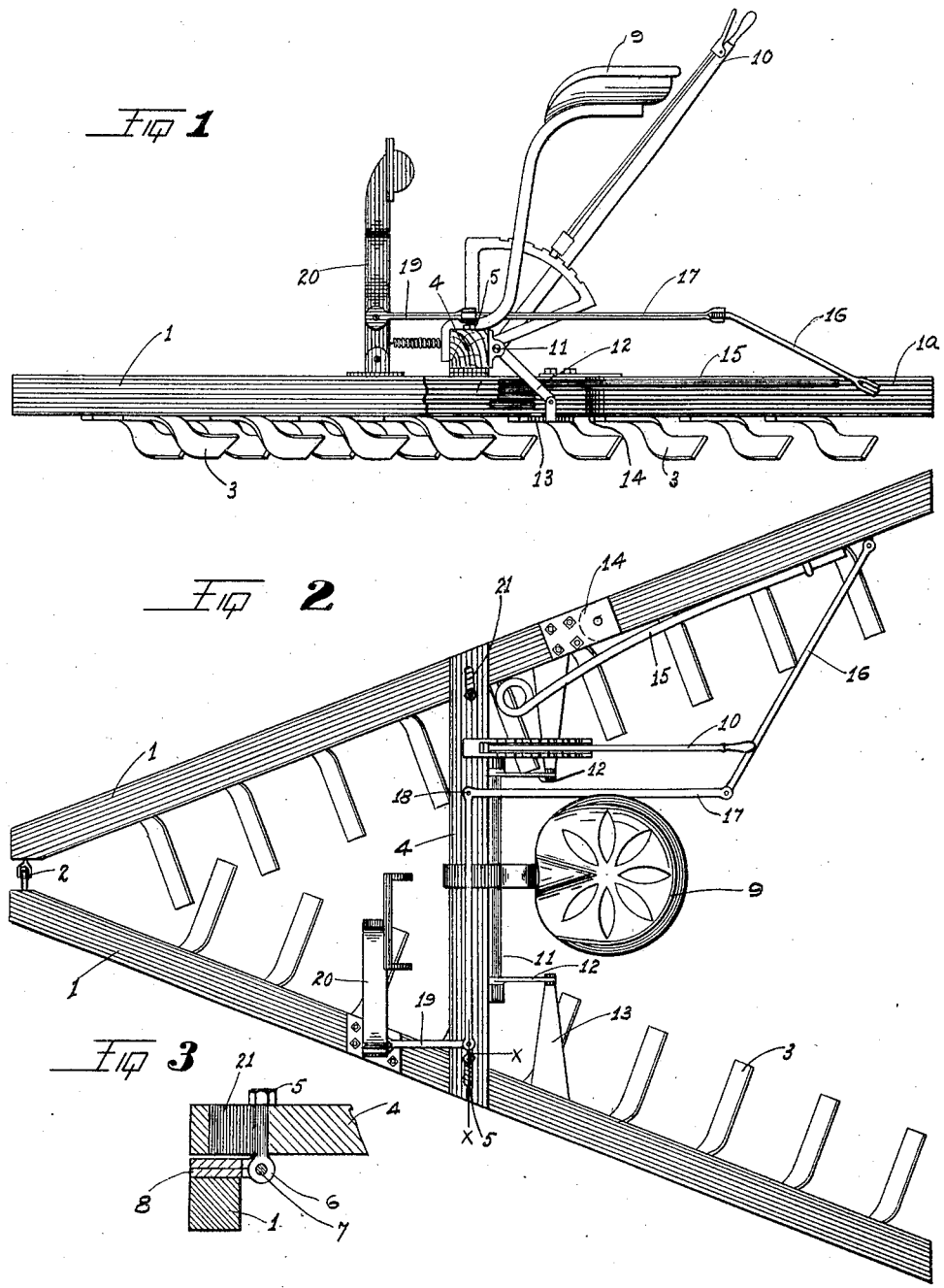

WALTER H. KEEN AND ALBERT P. BELLOWS, OF ACAMPO, CALIFORNIA.

CULTIVATOR.

1,067,986. Specification of Letters Patent. Patented July 22, 1913.

Application filed June 3, 1912. Serial No. 701,255.

*To all whom it may concern:*

Be it known that we, WALTER H. KEEN and ALBERT P. BELLOWS, citizens of the United States, residing at Acampo, in the county of San Joaquin, State of California, have invented certain new and useful Improvements in Cultivators; and we do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in cultivators used for orchard, garden and vineyard work, the object of the invention being to produce a cultivator which may be adjusted to dig deep into the soil or to merely cultivate the top of the soil lightly. A further object of the invention being to produce a cultivator having a movable arm whereby the cultivator may be worked in close proximity to a tree or vine without injuring the same or the outshoots of the same.

A further object of the invention is to produce a simple and inexpensive device and yet one which will be exceedingly effective for the purposes for which it is designed.

These objects, we accomplish by means of such structure and relative arrangement of the parts as will fully appear by a perusal of the following specification and claims.

On the drawings similar characters of reference indicate corresponding parts in the several views.

Figure 1 is a side elevation of the complete cultivator with one of the side members shown broken off. Fig. 2 is a top plan view of the device. Fig. 3 is a sectional view taken on a line X—X of Fig. 2.

Referring now more particularly to the characters of reference on the drawings, we first provide two beam members 1 disposed substantially V-shaped and connected by a flexible joint 2. On the underside of these members 1 are a plurality of cultivator teeth 3 of substantially the form shown.

The numeral 4 designates a cross beam having a depending pin 5 at each end provided with eyes 6 at their lower ends. Disposed through such eyes 6 are pins 7 hinged to which are hinges 8 secured to the members 1, whereby the said members 1 will have a hinged motion with respect to the beam 4.

The numeral 9 designates the seat of the device mounted in the usual manner on the beam 4 and in close proximity to the said seat 9 is a lever 10 secured to a turntable rod 11, such rod 11 being flexibly connected by links 12 with projecting arms 13 on the members 1. By means of this structure the said members 1 and incidently the cultivator members 3 may be mounted upwardly or downwardly by means of the hinged connection 7—8 and hence when the beams 1 project normally straight underneath the beam 4 the members 3 may be adapted to cut deeply into the soil but when it is desired to simply lightly cultivate the top of the soil then the lever 10 is operated tilting the members 1 on their hinged connection which will lift the members 3 and cause them to work near the surface of the soil.

One of the members 1 is divided into two parts forming an independent member 1$^a$ hinged to its member 1 by means of a hinge 14 and held in normal alined position with its member 1 by means of a spring 15.

Connected with the rear end of the member 1$^a$ is a rod 16 connected with a bell crank 17 fulcrumed on the beam 4 as at 18 and connected at its other end by means of a rod 19 to a spring pulled foot lever 20, whereby by operating said foot lever 20 the member 1$^a$ will be pulled inwardly which can be done in passing a tree or vine. This operation will permit the entire surface of the soil around said vine or tree to be cultivated and since the operator can pull this member 1$^a$ inward as the vine or tree is passed no injury to the same will occur.

The width of the cultivator may be changed by moving the pins 5 in slots 21 in the beam 4 accordingly as it is desired to cultivate a wider or narrower space at one time.

From the foregoing description it will be readily seen that we have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described our invention what we claim as new and useful and desire to secure by Letters Patent is:

1. A cultivator comprising two horizontal beams flexibly connected at one end and a cross beam, each of said horizontal beams being hinged to one end of said cross beam, a lever mechanism rigidly connected on said cross beam and flexibly connected to said horizontal beams and adapted to move said horizontal beams on their hinges, and cultivator teeth on said horizontal beams as described.

2. A device of the character described comprising two horizontal beams flexibly jointed at one end, a cross beam hinged at each end to one of said horizontal beams, such hinge comprising a pin projecting through said cross beam and provided with an eye at its lower end, a pin disposed through said eye, hinged leaves mounted on said last named pin, such hinged leaves being secured to said horizontal beams, a lever mechanism connected with said cross beam and said horizontal beams to move said horizontal beams on said hinges, and cultivator teeth on said horizontal beams as described.

3. A device of the character described comprising two horizontal beams flexibly connected at one end, a cross beam provided with a slot at each end, a pin projecting through each slot and adapted to be fixed in position therein, a hinge on each pin, each of said hinges being connected with one of said horizontal beams, a lever mechanism connected with said cross beam and with said horizontal beams, and cultivator teeth on said horizontal beams, as described.

In testimony whereof we affix our signatures in presence of two witnesses.

WALTER H. KEEN.
ALBERT P. BELLOWS.

Witnesses:
CLARENCE M. SMITH,
MABEL G. BOARD.

---

Copies of this patent may be obtained for five cents each, by addressing the "Commissioner of Patents, Washington, D. C."